United States Patent [19]

Davis et al.

[11] Patent Number: 5,357,617
[45] Date of Patent: Oct. 18, 1994

[54] METHOD AND APPARATUS FOR SUBSTANTIALLY CONCURRENT MULTIPLE INSTRUCTION THREAD PROCESSING BY A SINGLE PIPELINE PROCESSOR

[75] Inventors: Gordon T. Davis, Raleigh, N.C.; Sebastian Ventrone, Jericho, Vt.

[73] Assignee: International Business Machines Corporation, Armonk, N.Y.

[21] Appl. No.: 796,194

[22] Filed: Nov. 22, 1991

[51] Int. Cl.$^5$ .......................... G06F 9/00; G06F 9/38; G06F 9/40

[52] U.S. Cl. .................... 395/375; 395/800; 364/231.6; 364/231.8; 364/262.4; 364/DIG. 1

[58] Field of Search ............... 395/375, 575, 425, 800, 395/650

[56] References Cited

U.S. PATENT DOCUMENTS

| | | |
|---|---|---|
| 4,244,028 | 1/1981 | Haines ................... 364/172 |
| 4,305,124 | 12/1981 | Marro et al. ............ 395/250 |
| 4,320,453 | 3/1982 | Roberts et al. ......... 395/375 |
| 4,546,431 | 10/1985 | Horvath . |
| 4,551,798 | 11/1985 | Horvath . |
| 4,586,127 | 4/1986 | Horvath . |
| 4,594,655 | 6/1986 | Hao et al. . |
| 4,646,236 | 2/1987 | Crockett et al. . |
| 4,757,445 | 7/1988 | Zolnowsky et al. ..... 395/375 |
| 5,010,476 | 4/1991 | Davis ..................... 395/325 |
| 5,117,387 | 5/1992 | Nemisovsky et al. ... 395/375 |

*Primary Examiner*—Alyssa H. Bowler
*Assistant Examiner*—Alpesh M. Shah
*Attorney, Agent, or Firm*—Heslin & Rothenberg

[57] ABSTRACT

A hybrid pipelined processor and associated processing methods are described for separately handling substantially concurrently in a time division manner multiple program instruction threads. The hybrid architecture includes an instruction fetch unit, an instruction decode unit and an execution unit. The execution unit includes multiple sets of register files each of which contains the working contents for a corresponding one of a plurality n of instruction threads. Timing and control circuitry is coupled to each of the principal processor components for controlling the timing and sequence of operations on instructions from the plurality n of instruction threads such that multiple instruction threads are separately handled substantially concurrently. Corresponding hybrid processing methods for such a single pipelined processor are also discussed.

23 Claims, 3 Drawing Sheets

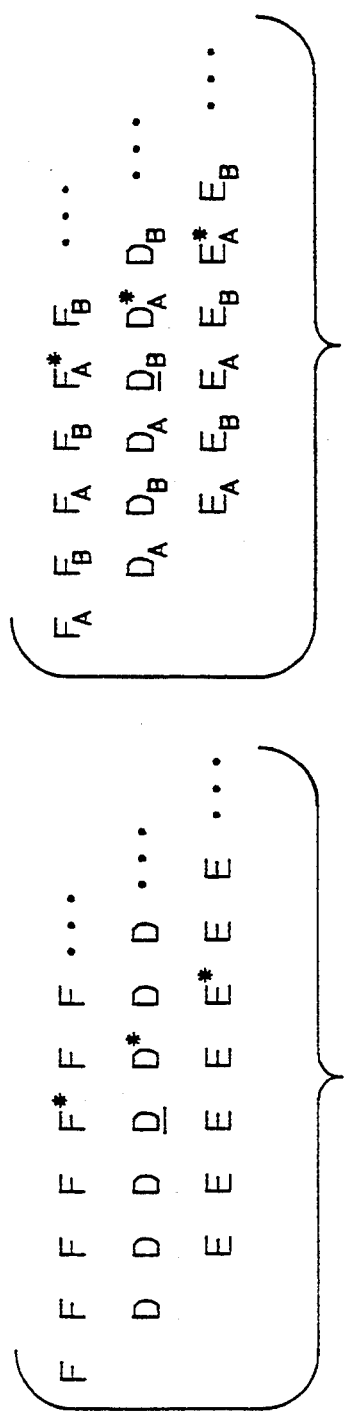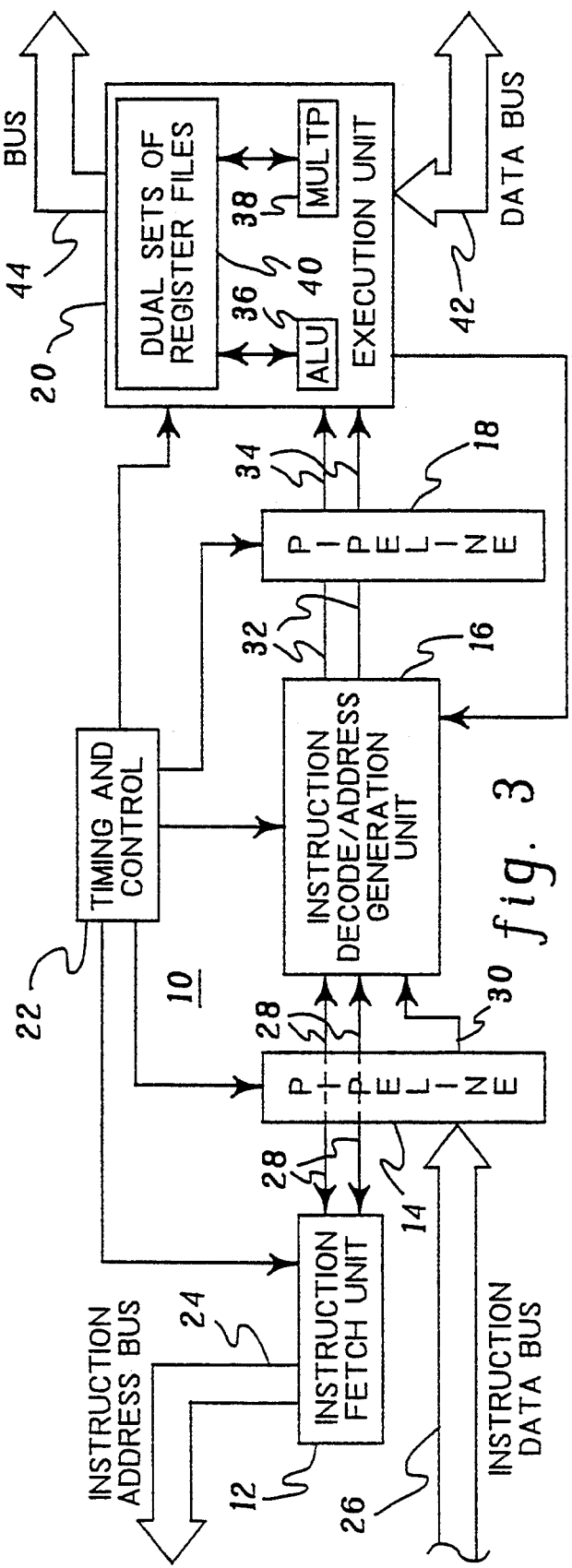

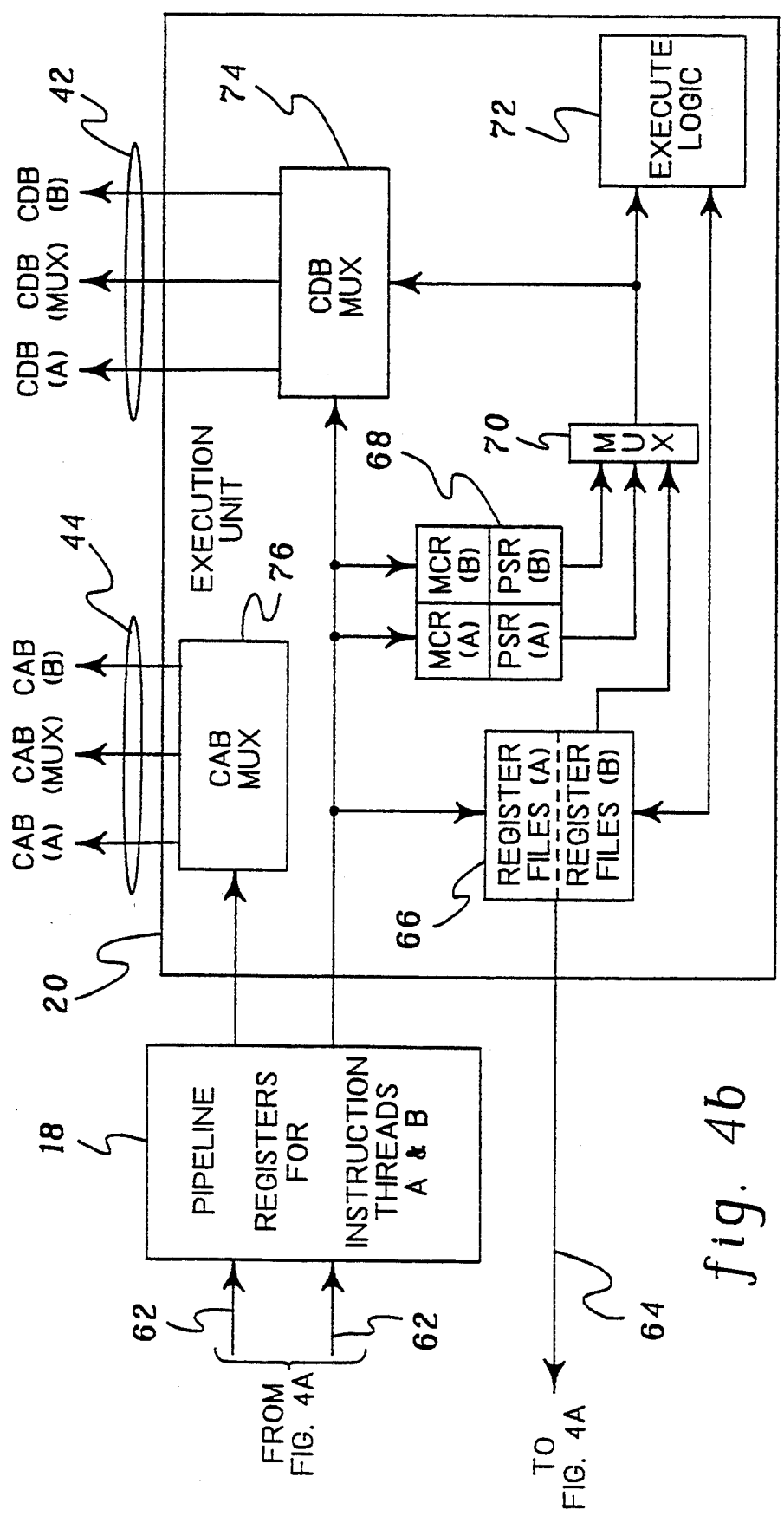

METHOD AND APPARATUS FOR SUBSTANTIALLY CONCURRENT MULTIPLE INSTRUCTION THREAD PROCESSING BY A SINGLE PIPELINE PROCESSOR

TECHNICAL FIELD

This invention relates in general to pipelined processors and to pipeline processing methods, and more particularly, to a single, hybrid pipelined processor configured to accept multiple program instruction threads and to the processing methods thereof.

BACKGROUND ART

Pipeline data processing systems are well known in the art, e.g., see U.S. Pat. Nos. 4,594,655 and 4,646,236 and the references discussed therein. Pipelining techniques are especially well known in digital signal processor (DSP) technology. Typically, a pipeline processor enhances execution speed by separating the instruction processing function into three pipeline phases. This phase division allows an instruction to be fetched (F), while a previous instruction is decoded (D), and an instruction before that is executed (E). As shown in FIG. 1, the total elapsed time to process (i.e., fetch, decode and execute) a single instruction is three machine cycles. However, the average throughput is one instruction per machine cycle because of the overlapped operations of three pipelined phases. This processing speed improvement is the motivation for using pipelined architectures, but along with this benefit come a number of limitations.

In particular, pipelined processors are more difficult to program due to constraints forced by the hardware. By way of example, the following restrictions are typical.

(1) An instruction in a standard serial sequence program disposed after a branch instruction is always executed because the instruction is fetched before the branch instruction is decoded as a branch (refer to FIG. 1 wherein $\underline{D}$ is assumed to decode to be a branch instruction). Because of phase division, the instruction designated by F* is brought into the pipelined processor contemporaneous with decoding of branch instruction $\underline{D}$. In the next two machine cycles, this instruction F* is decoded D* and then executed E*, i.e., unless otherwise overridden. Sometimes a useful instruction can be placed subsequent a branch instruction, but finding such an instruction can be difficult and the readability of the program can be damaged. Often, this position is simply padded with a no operation (NOP) instruction.

(2) For the same reason explained above with respect to a branch instruction, an interrupt typically forces a NOP instruction after the interrupt vector is processed.

(3) If an index register is to be altered (incremented or loaded) by an instruction, it cannot be used to generate an address for the following instruction. This is because the corresponding register is updated during phase three of the pipeline processing and is therefore unavailable in the same machine cycle (i.e., at the beginning of phase two thereof) to generate an address. Again, a NOP instruction may be required to ensure that the correct index is used.

(4) Conditional branch operations can have similar problems to those noted above and the same limitations since conditions are typically the result of phase three ALU processor operations.

In each example discussed, the processing problem arises from a need for a time delay of one machine cycle in order to stabilize the result of a prior instruction before that instruction result can be used by a subsequent instruction. Pursuant to the present invention, all of the above-noted constraints are advantageously eliminated by structuring the pipelined processor to alternately handle multiple instruction pathlengths substantially simultaneously in a time division manner.

DISCLOSURE OF INVENTION

Briefly described, this invention comprises in a first principal aspect a single, hybrid pipelined processor for substantially concurrent processing of a plurality n of program instruction threads. Each of the instruction threads is defined by a series of instructions, e.g., stored in an instruction memory coupled with the pipelined processor. The processor includes a single instruction fetch unit for fetching instructions from the instruction memory and a single instruction decode unit for decoding fetched instructions. A first pipeline is coupled to receive and latch the fetched instructions for subsequent reading by the instruction decode unit. An execution unit executes instructions decoded by the instruction decode unit. The execution unit includes n sets of register files each of which contains the working contents for a corresponding one of the plurality n of instruction threads. A second pipeline is coupled between the instruction decode unit and the execution unit for latching decoded instructions for subsequent reading by the execution unit. A timing and control circuit is coupled to each of the instruction fetch unit, instruction decode unit, and execution unit for controlling the timing and sequence of operations on instructions of the plurality n of instruction threads such that multiple instruction threads are separately handled substantially concurrently in a time division manner, with the hybrid pipelined processor switching between instructions of the plurality n of instruction threads. Numerous specific and enhanced features of the hybrid architecture are also described and claimed.

In another aspect, the present invention comprises certain novel processing methods associated with the hybrid architecture. For example, a first method is provided for substantially concurrent processing of a plurality n of program instruction threads within a pipelined processor. Again each of the instruction threads is defined by a series of instructions contained within instruction memory associated with the pipelined processor. The pipelined processor includes n register file sets, each of the n register file sets contain the working contents for a corresponding one of the plurality n of instruction threads. The method includes the steps of: fetching an instruction from one of the program instruction threads; decoding the fetched instruction while simultaneously fetching another instruction from a different one of the instruction threads; executing the decoded instruction fetched from one of the instruction threads while simultaneously decoding the another instruction fetched from a different one of the instruction threads and fetching a new instruction from one of the instruction threads, the executing step further including storing the working results of the executed instruction in one of the n register file sets; executing the decoded instruction fetched from the different one of the plurality n of instruction threads while simultaneously decoding the newly fetched instruction and fetching another new instruction from one of the plurality of instruction threads, the executing step further including storing the results of the executed another instruction in one of the n register file sets; and repeating the executing steps for a plurality of instructions within the instruction threads such that multiple instruction threads are separately handled substantially concurrently in a time division manner within the single pipelined processor.

Further, a method is provided for substantially concurrent processing of dual instruction threads within a single pipelined processor. In this method, a first instruction thread is defined by a first series of instructions contained within instruction memory associated with the pipelined processor and a second instruction thread is defined by a second series of instructions contained within the instruction memory. The method includes the steps of: fetching an instruction from the first instruction thread; decoding the instruction fetched from the first instruction thread while simultaneously fetching an instruction from the second instruction thread; executing the decoded instruction fetched from the first instruction thread while simultaneously decoding the instruction fetched from the second instruction thread and fetching another instruction from the first instruction thread; executing the decoded instruction fetched from the second instruction thread while simultaneously decoding the another instruction fetched from the first instruction thread and fetching another instruction from the second instruction thread; and repeating the two executing and simultaneous decoding and fetching steps for a plurality of instructions in the first instruction thread and the second instruction thread such that the dual instruction threads are separately processed substantially concurrently in a time division manner within the single pipelined processor.

To summarize, the present invention comprises a novel hybrid pipelined processor configured to accept multiple program instruction threads and certain novel processing methods associated therewith. By being able to process multiple instruction threads simultaneously, the hybrid architecture and its associated methods effectively hide the previous negative effects of pipeline processing. Multiple instruction threads are separately handled substantially concurrently in a time division manner such that the pipelined processor efficiently switches between the program instruction threads. In this way, pipeline breaks associated with branch, interrupt, and certain conditional decode, etc., instructions are masked. The result is a hybrid pipelined processor implementable as a single, fast integrated circuit chip having superior performance characteristics to those obtainable by traditional pipeline processors.

BRIEF DESCRIPTION OF THE DRAWINGS

These and other objects, advantages and features of the present invention will be more readily understood from the following detailed description of certain preferred embodiments thereof, when considered in conjunction with the accompanying drawings in which:

FIG. 1 is a serial sequence diagram for the fetch, decode, and execute processing phases of a conventional pipelined processor;

FIG. 2 is an alternating sequence diagram for one embodiment of interleaved fetch, decode and execute processing phases of a multiple instruction thread pipelined processor pursuant to the present invention;

FIG. 3 is a schematic of one embodiment of a multiple instruction thread pipelined processor pursuant to the present invention; and FIGS. 4a & 4b are a more detailed schematic of certain principal components of the multiple instruction thread pipelined processor of FIG. 3.

BEST MODE FOR CARRYING OUT THE INVENTION

Figure 4A:
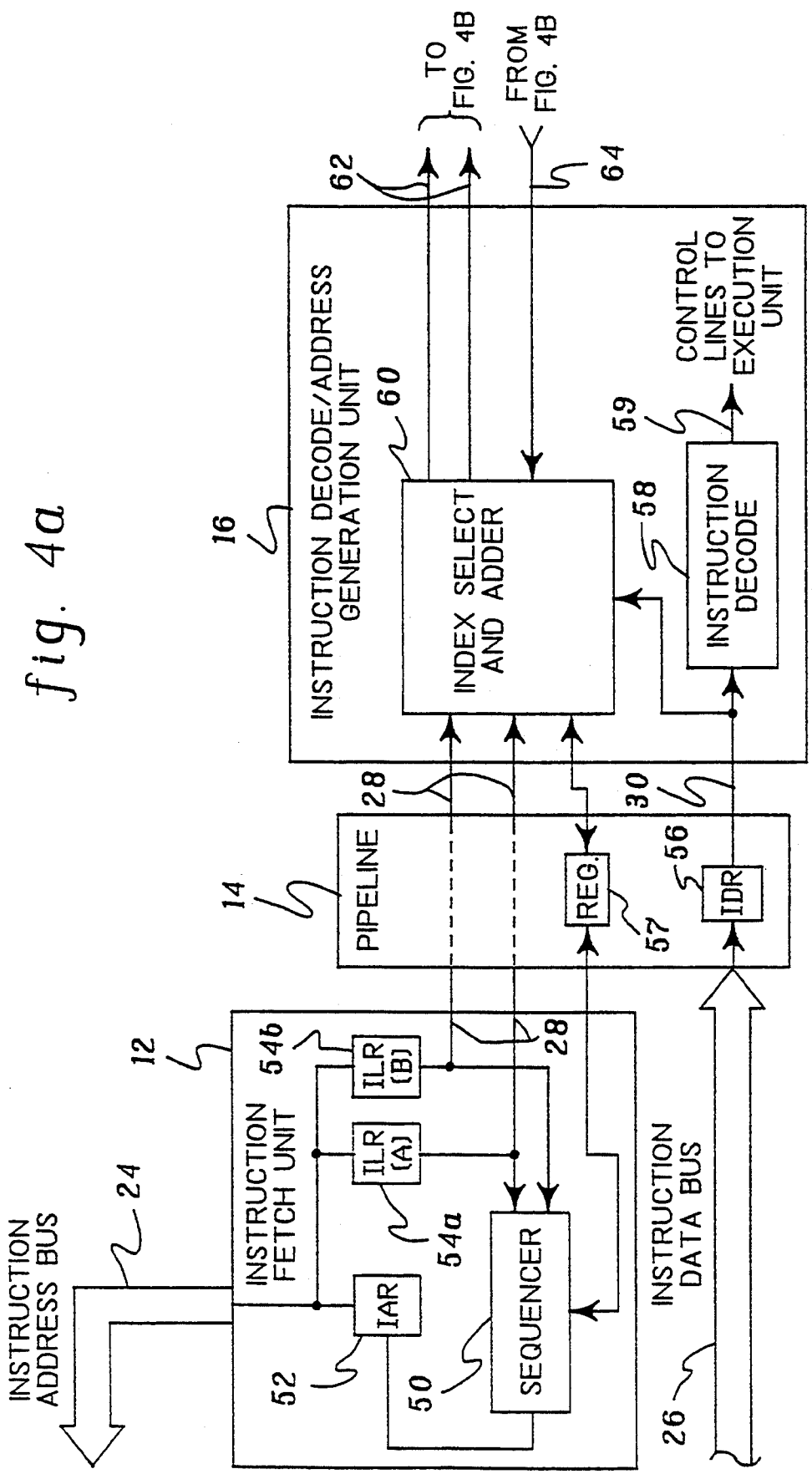

Reference is now made to the drawings in which the same reference numbers are used throughout the different figures to designate the same or similar components.

FIG. 2 is a sequencing diagram depicting one embodiment of interleaved processing of dual instruction threads. A first program thread is designated the "A" instruction thread, while a second program thread is referenced as the "B" instruction thread. In this sequencing embodiment, the pipelined processor of the present invention alternately switches between fetching from instruction memory an instruction from the "A" instruction thread ($F_A$) and fetching from instruction memory an instruction from the "B" instruction thread ($F_B$) so that thread "A" and thread "B" instructions are alternately decoded ($D_A$, $D_B$) and executed ($E_A$, $E_B$). In this manner, pipelined processing remains unbroken notwithstanding decoding of a jump, interrupt, etc., instruction. Should, for example, the instruction at decode ($D_B$) be decoded as a branch instruction, the next decode $D^*_A$ is still valid, as is the execute $E^*_A$ step immediately thereafter. This is because the instruction fetched (i.e., $F^*_A$) in the contemporaneous machine cycle with the decoding of the branch instruction ($D_B$) belongs to instruction thread "A" of the program which is unaffected by a decoded branch instruction for thread "B".

If desired, program instructions could be compiled into three or more instruction threads for processing by a single pipelined processor pursuant to the present invention. (Although only manual compiling of program instructions into multiple threads is presently possible, automatic compilers will soon be available to accomplish this task.) Irrespective of the number of threads, the context of each instruction thread must be maintained independent of the other instruction threads in the hybrid pipelined processor. Further, those skilled in the art will recognize that various sequencing configurations could be implemented. For example, in a dual instruction thread format, two "A" thread instructions could be sequentially selected followed by a "B" thread instruction, followed by two more "A" thread instructions, followed by a "B" thread instruction, etc. The only preferred constraint is that the instruction program be compiled and the sequencing of fetch, decode and execute operations be performed such that any instruction which would otherwise break pipeline processing (e.g., a branch or interrupt instruction) is followed by instruction processing from a different instruction thread.

One embodiment of the hybrid architecture of the present invention is depicted in FIG. 3. This embodiment is configured as a dual instruction thread processor, however as noted greater than two instruction threads could also be accommodated with minor modifications, discussed further below. The hybrid pipelined processor, generally denoted 10, includes an instruction fetch unit 12, a first pipeline 14, an instruction decode-/address generation unit 16, a second pipeline 18, and an execution unit 20. Timing and sequence of operations among the various components of processor 10 are controlled by a timing and control unit 22.

Pipelined processor 10 splits the instruction fetching process from the data fetching process and stores the corresponding information in two separate memory banks. Pipelined processor 10 is divided into three phases, namely, an instruction fetch phase, instruction decode/address generation phase, and an execution phase. In the instruction fetch phase, unit 12 transmits via instruction address bus 24 the address of an instruction stored in one of the dual instruction threads contained in instruction memory (not shown). Fetched instructions, which are returned to processor 10 via instruction data bus 26, are latched initially in a register(s) (not shown) contained within first pipeline 14. Unit 12 also communicates directly with unit 16 via certain bidirectional lines 28.

In the next phase, decode unit 16 reads (via bus 30) instructions latched in the register of pipeline 14. Should unit 16 decode a fetched instruction as a branch instruction, an address corresponding to the desired instruction branch is generated. The branch address is fed back to unit 12 (via lines 28) and subsequently output on bus 24 to instruction memory. Again, timing and control unit 22 controls the sequence of operations between decode/address generation unit 16, pipeline 14 and instruction fetch unit 12. Decoded instructions, which are output on lines 32 and latched in dual registers (not shown) in a second pipeline 18, are subsequently read (via lines 34) by execution unit 20 during the following machine cycle.

Execution unit 20 is significantly modified in comparison with prior art pipelined processor execution circuitry. For example, in addition to containing conventional execute logic such as an ALU 36 and a multiplier 38, unit 20 includes register files segregated into multiple register sets 40. (In the example described herein, only dual register sets are shown.) Each set of register files is assigned to one of the dual threads "A" and "B" of the instruction threaded program. Each set of register files is appropriately sized to accommodate the working content of the instructions of the associated instruction thread. In addition to these working registers, status registers are used such as current status, address pointers and index registers, along with other information required to preserve processor status. Again, each instruction thread is assigned a separate set of instruction registers.

Timing and control circuit 22 toggles the outputs (CDB(A), CDB(B), CAB(A), CAB(B)) on a common data bus (CDB) 42 and a common address bus (CAB) 44 once each machine cycle (i.e., assuming that processor 10 is programmed for interleaved instruction processing of thread "A" and "B" as shown in FIG. 2). The toggled control signal from circuit 22 is also used by unit 20 as a high-order select line to the register files such that on even machine cycles a first set of register files is defined as active, and on odd machine cycles a second set of register files is used. If a RAM macro is used to define register files 40, multiple read and write ports may be required to accommodate multiple sources and destinations of the various instructions (especially for parallel instructions used in digital signal processors), as well as for accessing of index registers used for data address generation. It may be desirable to partition such a RAM array into separate functions which deal exclusively with instruction fetch and address generation. However, whether the machine contacts are consolidated into a single file or RAM, or distributed across several files or RAMs, the basic concepts remain the same.

FIGS. 4a & 4b depict in more detail certain key components of hybrid pipelined processor 10 of FIG. 3. Specifically, shown in somewhat greater detail are instruction fetch unit 12, first pipeline 14, instruction decode/address generation unit 16, second pipeline 18 and execution unit 20. Timing and control interconnections are omitted from these figures for reasons of clarity. Those skilled in the art will be able to implement the desired timing and control functions from the description provided herein.

Referring first to FIG. 4a, fetch unit 12 is shown to include a sequencer 50, an instruction address register (IAR) 52 and two instruction link registers ILR(A) 54a and ILR(B) 54b. In operation, sequencer 50 identifies the next instruction address to be latched to IAR 52, and hence output to instruction memory via instruction address bus 24. Registers 54a & 54b are coupled to also receive the output of IAR 52. These registers 54a & 54b serve to identify the last instruction fetched from instruction thread A and instruction thread B, respectively. The information contained in these registers is also fed back to sequencer 50 which increments the signal for the next select address. In operation, sequencer 50 functions as an adder such that the instructions definitive of each program thread are alternatively sequentially fetched. Timing and sequence control 22 (FIG. 3) oversees sequencer 50 selection of the latched address in either ILR(A) or ILR(B).

Instructions retrieved from instruction memory are fed by instruction data bus 26 to an instruction data register (IDR) 56 within first pipeline 14 of system 10 (FIG. 3). With the next machine cycle, instruction decode/address generation unit 16 reads and decodes the instruction information latched in register 56. Again timing and control 22 (FIG. 3) tracks whether an instruction read from register 56 is part of instruction thread A or instruction thread B. Instructions retrieved by unit 16 are fed to an instruction decode logic block 58, which operates to decode the instruction and output appropriate control signals to execution unit 20 via lines 59 coupled thereto. For purposes of clarity, control line 59 couplings are omitted from FIGS. 4a & 4b.

The instruction read from register 56 is also passed to an index select and adder circuit 60 which is coupled through pipeline 14, and in particular a register 57, to sequencer 50 of unit 12. If appropriate, circuit 60 generates a jump to instruction address, which is placed in register 57 for subsequent reading by sequencer 50. For example, if logic 58 decodes a branch instruction, index select and adder circuit 60 generates the appropriate address for the branch instruction. Index select and adder circuit 60 of unit 16 is also coupled to the pipeline registers of the second pipeline 18, e.g., via lines 62 (see FIG. 4b). In addition, circuit 60 can receive data from the dual sets of register files 40 in execution unit 20 (via line 64).

Referring now to FIG. 4b, decoded instructions are placed in separate thread A and thread B registers within second pipeline 18 for execution during the next machine cycle. Central to execution unit 20 is the provision of multiple (in this example dual) sets of register files, i.e., register files (A) & register files (B) 66. These sets of files comprise the working registers for both instruction thread A and instruction thread B. Timing and control circuit 22 (FIG. 3) tracks whether a given instruction undergoing execution belongs to thread (A) or thread (B).

In addition to register files 66, execute unit 20 includes multiple stacks 68 of status registers, e.g., memory control registers MCR(A) & MCR(B), and pipeline status registers PSR(A) & PSR(B), etc. Each of these status register stacks has access to the instructions read from the registers of pipeline 18. The output of registers 68 is supplied to a multiplexer 70 which is also connected directly to the dual sets of register files 66. The output of multiplexer 70 is coupled to execute logic 72, which for example, may include a conventional multiplier, ALU and additional multiplexers. Execute logic 72 is also connected directly to the dual sets of register files 66. Output from execution unit 20 is via a first multiplexer CAB MUX 76 which outputs on a common address bus 44 a data address signal for instruction thread A or instruction thread B. In addition, a common data bus multiplexer CDB MUX 74 outputs/receives via a common data bus 42 data as directed by an executed instruction from instruction thread (A) or instruction thread (B).

To summarize, by using two independent instruction threads an extra processing phase for NOP instructions is eliminated and the pipeline becomes essentially transparent. Specifically, each of the processor threads appears as if were executing within the original non-pipelined structure. The concept may be extended to use with additional instruction threads and/or additional phases to the pipeline structure. An n-phase pipeline is created by pipelining slower circuits so that parts of two different instructions are flowing through them (e.g., one instruction in a first cycle and another instruction in a second cycle). Using this concept for each of the fetch, decode and execute phases described herein would essentially introduce a six phase pipeline as a replacement for the original three phases.

As a further example, a program compiled into four instruction threads could be used with a RAM holding four complete sets of register files and a two bit counter driving the RAM addresses. In such a case, a six phase pipeline would be made transparent. In general, the number of pipeline phases may be doubled without impacting code execution by doubling the number of instruction threads. An additional feature of the disclosed architecture can be exploited in high performance applications. In particular, fast context switching can be obtained by using multiple register files in a common processor. In such an environment, the processor can be switched from a multiple instruction thread mode into a mode which has a single instruction thread.

Multiple instruction threaded programs can add complications to the process of determining which tasks are being executed by which thread. However, this complication is considered minor compared to the improved performance obtained by pipelining and avoiding NOPs, as well as the simplified program flow possible with a transparent pipeline. Further, multiple instruction threads have proven beneficial in handling multiple asynchronous real time events. If multiple events are handled by a single processor thread, only one thread has the attention of the processor at a time and may tend to cause timing problems if it maintains control of the processor for too long a period. In a multi-thread environment, however, multiple thread processing is handled simultaneously. The long term average processing throughput is the same, but response time can be improved significantly. This is essentially a hardware cuing mechanism which divides available processing power evenly among multiple instruction threads, with zero processing overhead required to move a task into and out of the processor.

In currently perceived applications, fixed task allocations are given to each instruction thread, thus no special assemblers or compilers are required. At initiation, program code simply reads an ID word to identify which instruction thread it is executing on and branches to the appropriate task. If multiple instruction threads respond to the same interrupt level, the interrupt handler may also inspect this ID word to determine the required action. When an interrupt is responded to by one instruction thread, it will take one machine cycle to refill the pipeline, but since that machine cycle is for another instruction thread, there is no apparent delay. In the future dynamic allocation of tasks to each instruction thread may be possible based on processing load. This may require special compilers and other techniques which are not currently required.

Those skilled in the art will recognize that a novel pipelined processor configured to accept multiple program instruction threads and accompanying processing methods have been described herein. Using the technique presented multiple instruction threads are separately handled substantially concurrently in a time division manner such that the pipelined processor efficiently switches between the program instruction threads. In this way, pipeline breaks associated with branch interrupt and certain conditional decode, etc., instructions are masked. The result is a hybrid pipelined processor implementable as a single, fast integrated circuit chip having superior performance characteristics. In addition to digital signal processors, the concepts described herein could also be extended to high performance microprocessors as well as large mainframe processors.

While the invention has been described in detail herein in accordance with certain preferred embodiments thereof, many modifications and changes therein may be affected by those skilled in the art. Accordingly, it is intended by the appended claims to cover all such modifications and changes as fall within the true spirit and scope of the invention.

We claim:

1. A hybrid pipelined processor for substantially concurrent processing of a plurality n of program instruction threads from a single program, each of said plurality n of program instruction threads being defined by a series of instructions, said pipelined processor comprising:

an instruction fetch unit for fetching instructions from said plurality n of program instruction threads;

an instruction decode unit for decoding instructions fetched by said instruction fetch unit;

first pipeline means coupling said instruction fetch unit and said instruction decode unit for latching said fetched instructions from said instruction fetch unit for reading by said instruction decode unit;

an execution unit for executing instructions decoded by said instruction decode unit, said execution unit including n sets of register files, each of said n register file sets containing working contents for a corresponding one of said plurality n of program instruction threads;

second pipeline means, coupling said instruction decode unit and said execution unit, for latching decoded instructions from said instruction decode unit and reading of said decoded instructions by said execution unit; and timing and control means, coupled to each of said instruction fetch unit, instruction decode unit and execution unit, for controlling the timing and sequence of operations on instructions of said plurality n of program instruction threads such that multiple instruction threads are separately processed substantially concurrently in a time division manner.

2. The hybrid pipelined processor of claim 1, wherein said instruction fetch unit fetches instructions from each of said plurality n of program instruction threads in a substantially predefined sequence.

3. The hybrid pipelined processor of claim 2, wherein said plurality n of program instruction threads includes a first instruction thread and a second instruction thread, and wherein said instruction fetch unit alternately fetches instructions from each of said first instruction thread and said second instruction thread for pipeline processing.

4. The hybrid pipelined processor of claim 3, wherein said instruction fetch unit includes a first instruction link register and a second instruction link register, each said instruction link register latching an address fetched from a corresponding one of said first instruction thread and said second instruction thread.

5. The hybrid pipelined processor of claim 4, wherein said instruction fetch unit further includes a sequencer coupled to each of said first and second instruction link registers for determining an address for a next instruction to be fetched from one of said first instruction thread and said second instruction thread.

6. The hybrid pipelined processor of claim 2, wherein said execution unit further includes a plurality n of status registers, each of said status registers for storing data associated with processor status for a corresponding one of said plurality n of program instruction threads.

7. The hybrid pipelined processor of claim 3, wherein said execution unit further includes two sets of status registers, each of said two sets of status registers storing data associated with processor status for a corresponding one of said first instruction thread and said second instruction thread.

8. The hybrid pipelined processor of claim 7, wherein said execution unit includes two sets of register files and two sets of status registers, each of said two sets of register files and each of said two sets of status registers being associated with a corresponding one of said first instruction thread and said second instruction thread.

9. The hybrid pipelined processor of claim 8, wherein said second pipeline means includes first registers for latching decoded instructions from said first instruction thread and second registers for latching decoded instructions from said second instruction thread, and wherein said execution unit includes means for reading decoded instructions latched into either of said first registers and said second registers of said second pipeline means.

10. The hybrid pipelined processor of claim 9, wherein said execution unit further includes a common address bus output and a common address bus multiplexer coupled thereto for switching data address outputs between first instruction thread processing and second instruction thread processing.

11. The hybrid pipelined processor of claim 10, wherein said execution unit further includes a common data bus output and a common data bus multiplexer coupled thereto for switching data outputs between first instruction thread processing and second instruction thread processing.

12. The hybrid pipelined processor of claim 11, wherein said execution unit further includes execute logic including a multiplier and an arithmetic logic unit, said execute logic being coupled to said two sets of register files and to said two sets of status registers.

13. The hybrid pipelined processor of claim 1, wherein said instruction decode unit includes an instruction address generation unit for generating a branch instruction address for feedback to said instruction fetch unit upon decode of a branch instruction by said decode unit.

14. The hybrid pipeline processor of claim 1, wherein said plurality n of program instruction threads are stored in instruction memory coupled to the pipelined processor, and wherein said instruction fetch unit fetches instructions from said instruction memory.

15. A method for substantially concurrent processing of a plurality n of program instruction threads from a single program within a single pipelined processor, said plurality n of program instruction threads including a first program instruction thread and a second program instruction thread, each of said n instruction threads being defined by a series of instructions contained within an instruction memory associated with the pipelined processor, said pipelined processor including a timer and controller for controlling the timing and sequence of operations on instructions of said plurality n of program instruction threads, said pipelined processor further including n register file sets, each of said n register file sets containing working contents for a corresponding one of said plurality n of program instruction threads, said substantially concurrent processing method comprising the steps of:

(a) fetching a first instruction from said first program instruction thread;

(b) decoding said fetched first instruction while simultaneously fetching a second instruction from said second program instruction thread;

(c) executing said fetched and decoded first instruction while simultaneously decoding said fetched second instruction different one of said plurality n of instruction and fetching a third instruction from any one of said plurality n of instruction threads, said executing step (c) including storing working results of said fetched, decoded and executed first instruction in a corresponding one of said n register file sets; and (d) repeating said step (c) for a plurality of instructions from said plurality n of program instruction threads such that said plurality n of program instruction threads are separately processed substantially concurrently within said single pipelined processor.

16. The processing method of claim 15, wherein said single pipelined processor includes a first pipeline, and wherein said method further comprises the step of latching fetched instructions in said first pipeline, and wherein said decoding steps include reading latched instructions from said first pipeline.

17. The processing method of claim 16, wherein said single pipelined processor includes a second pipeline and wherein said method further comprises the step of latching decoded instructions to said second pipeline, and wherein said executing steps include reading latched decoded instructions from said second pipeline.

18. The processing method of claim 17, wherein said single pipelined processor includes a plurality n of status registers, each of said status registers for storing data associated with processor status for a corresponding one of said n program instruction threads, and wherein said executing steps each including storing said data in said status registers with execution of a decoded instruction.

19. A method for substantially concurrent processing of dual instruction threads from a single program within a single pipelined processor including a timer and controller for controlling the timing and sequence of operations on instructions of said dual instruction threads, a first instruction thread being defined by a first series of instructions and a second instruction thread being defined by a second series of instructions, said single pipelined processor including a first register file set containing working contents for said first instruction thread and a second register file set containing working contents for said second instruction thread, said substantially concurrent processing method comprising the steps of:

(a) fetching an instruction from said first instruction thread;

(b) decoding said instruction fetched from sad first instruction thread while simultaneously fetching an instruction from said second instruction thread;

(c) executing said decoded instruction fetched from said first instruction thread while simultaneously decoding said instruction fetched from said second instruction thread and fetching another instruction from said first instruction thread, said executing step (c) including storing working results of said executed decoded instruction fetched from said first instruction thread in said first register file set;

(d) executing said decoded instruction fetched from said second instruction thread while simultaneously decoding said another instruction fetched from said first instruction thread and fetching another instruction from said second instruction thread, said executing step (d) including storing working results of said executed decoded instruction fetched from said second instruction thread in said second register file set; and (e) repeating steps (c) & (d) for a plurality of instructions in said first instruction thread and said second instruction thread such that said dual instruction threads are separately processed substantially concurrently in a time division manner within said single pipelined processor.

20. The processing method of claim 19, wherein said single pipelined processor includes a first pipeline and wherein said method further comprises the step of latching fetched instructions in said first pipeline, and wherein said decoding steps include reading latched instructions from said first pipeline.

21. The processing method of claim 20, wherein said single pipelined processor includes a second pipeline and wherein said method further comprises the step of latching decoded instructions to said second pipeline, and wherein said executing steps include reading latched decoded instructions from said second pipeline.

22. The processing method of claim 19, wherein one or more of said fetching, decoding and executing steps includes accomplishing said step in multiple processing phases such that an n-phase pipelined processor (wherein n=4,5,6 . . .) is defined and processing performance is improved.

23. A method for sequentially processing, via a single pipelined processor including n register file sets, a plurality n of program instruction threads from a single program, each of said plurality n of program instruction threads being defined by a series of instructions contained within an instruction memory associated with said single pipelined processor, each of said n register file sets containing working contents for a corresponding one of said plurality n of program instruction threads, said method comprising the steps of:

(a) fetching a first instruction from any of said plurality n of program instruction threads;

(b) decoding said first instruction and determining if said decoded first instruction will inhibit said sequential processing;

(c) fetching a second instruction from any of said plurality n of program instruction threads except said program instruction thread having said first instruction therein if said first instruction is determined to inhibit said sequential processing, said step (c) of fetching being performed immediately after said step (b) of determining;

(d) executing said first instruction while simultaneously decoding said second instruction and determining if said decoded second instruction will inhibit said sequential processing, said executing step (d) including storing working results of said executed first instruction in a corresponding one of said n register file sets; and (e) fetching a third instruction from any of said plurality of n of program instruction threads except said program instruction thread having said second instruction therein if said second instruction is determined to inhibit said sequential processing, said step (e) of fetching being performed immediately after said step (d) of determining.

* * * * *

UNITED STATES PATENT AND TRADEMARK OFFICE
CERTIFICATE OF CORRECTION

PATENT NO. : 5,357,617
DATED : October 18, 1994
INVENTOR(S) : Davis et al.

It is certified that error appears in the above-indentified patent and that said Letters Patent is hereby corrected as shown below:

In the Claims:

Column 10, lines 47 & 48 delete "different one of said plurality n of instruction".

Column 11, line 29 delete "sad" and substitute therefor --said--.

Signed and Sealed this

Tenth Day of January, 1995

Attest:

BRUCE LEHMAN

Attesting Officer

Commissioner of Patents and Trademarks